(12) United States Patent
Clark et al.

(10) Patent No.: US 6,297,639 B1
(45) Date of Patent: Oct. 2, 2001

(54) METHOD AND APPARATUS FOR DIRECTIONAL WELL LOGGING WITH A SHIELD HAVING SLOPED SLOTS

(75) Inventors: Brian Clark, Sugar Land; Richard A. Rosthal, Houston; Dean M. Homan, Sugar Land; Dzevat Omeragic, Sugar Land; Stephen D. Bonner, Sugar Land; Scott S. Chesser, Richmond; Thomas D. Barber, Houston, all of TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/452,576

(22) Filed: Dec. 1, 1999

(51) Int. Cl.[7] .................................................. G01V 3/30
(52) U.S. Cl. .................................................. 324/338
(58) Field of Search .................................. 324/338–343, 324/346, 356, 369; 336/84 R, 84 M, 84 C; 343/841

(56) References Cited

U.S. PATENT DOCUMENTS

| | | |
|---|---|---|
| 3,551,797 | 12/1970 | Gouilloud et al. . |
| 4,319,191 | 3/1982 | Meador et al. . |
| 4,536,714 | 8/1985 | Clark . |
| 4,899,112 | 2/1990 | Clark et al. . |
| 4,949,045 | 8/1990 | Clark et al. . |
| 5,115,198 | 5/1992 | Gianzero et al. . |
| 5,508,616 | 4/1996 | Sato et al. . |
| 5,594,343 | 1/1997 | Clark et al. . |
| 5,757,191 | 5/1998 | Gianzero . |

FOREIGN PATENT DOCUMENTS

WO 98/00733   1/1998  (WO) .

OTHER PUBLICATIONS

Clark, B. et al., "Electromagnetic Propagation Logging While Drilling: Theory and Experiment", SPE Paper 18117 presented at the 63'rd Annual Technical Conference and Exhibition held in Houston, Texas, Oct. 2–5, 1988, pp. 103–117.

*Primary Examiner*—Jay Patidar
(74) *Attorney, Agent, or Firm*—Victor H. Segura

(57) ABSTRACT

Methods and apparatus for making directional measurements of earth formations surrounding a borehole. New antenna coil shield designs are utilized to provide selective attenuation of at least one electromagnetic energy field component as the component interacts with the shield. The new shields are implemented in several downhole tool configurations to provide azimuthally focused formation measurements. In effect, the new shield filters interacting electromagnetic energy field components to pass those components corresponding to a magnetic dipole oriented at an angle from the tool axis. The shields thereby alter a coil's envelope of influence to electromagnetic energy. The new shields also form part of a system for making directional measurements while drilling.

36 Claims, 16 Drawing Sheets

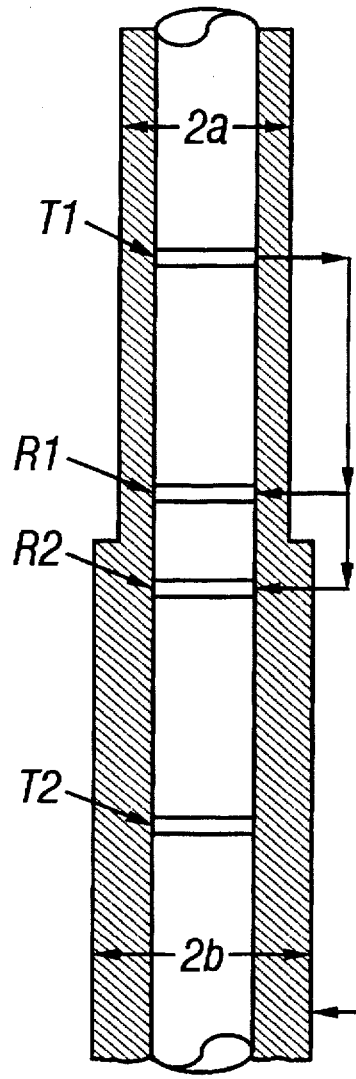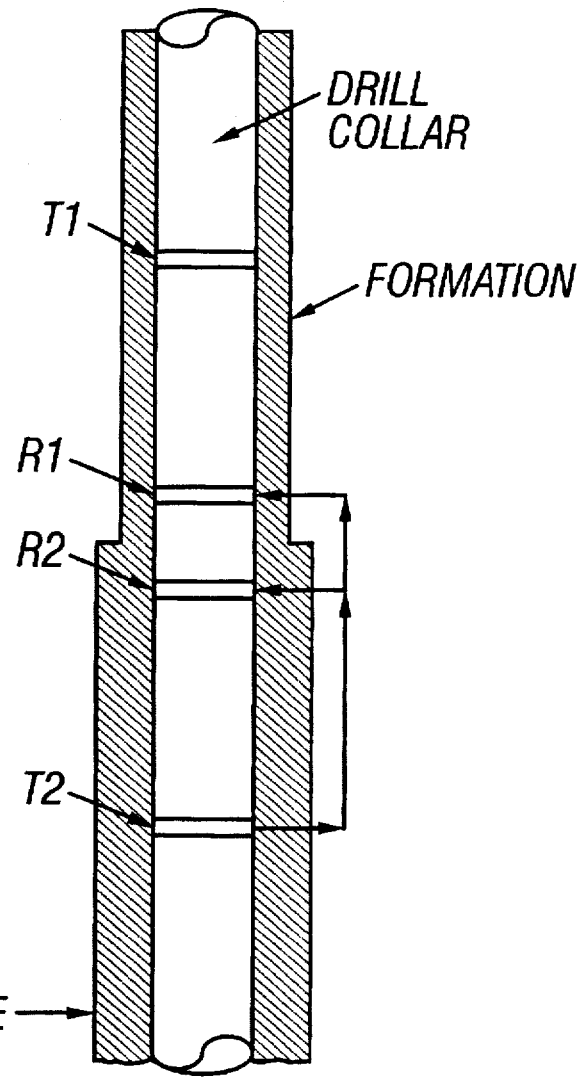
FIG. 19A
(Prior Art)
FIG. 19B
(Prior Art)

METHOD AND APPARATUS FOR DIRECTIONAL WELL LOGGING WITH A SHIELD HAVING SLOPED SLOTS

1. BACKGROUND OF THE INVENTION

1.1 Field of the Invention

This invention relates to the field of well logging and, more particularly, to an improved method and apparatus for making focused downhole measurements of formation characteristics. The invention has general application in the well logging art, but is particularly useful in logging-while-drilling.

1.2 Description of Related Art

Resistivity logging is a well-known form of electromagnetic ("EM") propagation logging. Resistivity logging is used for measuring and evaluating the characteristics of potential hydrocarbon bearing zones in subsurface formations. Porous formations having high resistivity generally indicate the presence of hydrocarbons, while low resistivity formations are generally water saturated.

In conventional logging techniques, a number of antennae or coils are mounted on a well tool. The tool is lowered into a borehole on the end of a cable, or wireline. An alternating current energizes one or more transmitter coils to emit EM energy into the formations. The emitted energy propagates through the formations or induces currents in the formations surrounding the borehole. The EM energy or currents are detected and measured by one or more receiver coils on the tool. The cable, which is attached to some sort of mobile processing center at the surface, is the means by which measured data is sent up to the surface. With this type of wireline logging, it becomes possible to measure borehole and formation parameters as a function of depth, i.e., while the tool is being pulled uphole.

An alternative to wireline logging techniques is the collection of data on downhole conditions during the drilling process. By collecting and processing such information during the drilling process, the driller can modify or correct key steps of the operation to optimize performance. Formation information collected during drilling also tends to be less affected by fluid invasion processes or other undesirable influences as a result of borehole penetration, and therefore are closer to the properties of the virgin formation.

Schemes for collecting data of downhole conditions and movement of the drilling assembly during the drilling operation are known as measurement-while-drilling ("MWD") techniques. Similar techniques focusing more on measurement of formation characteristics than on movement of the drilling assembly are know as logging-while-drilling ("LWD"). However, the terms MWD and LWD are often used interchangeably, and the use of either term in the present disclosure should be understood to include both the collection of formation and borehole information, as well as data on movement of the drilling assembly, U.S. Pat. No. 3,551,797 describes a conventional EM propagation logging technique. The '797 patent describes the transmission of EM energy into the formations, where energy shed back into the borehole is measured by receivers to determine the relative attenuation and/or the phase shift of the EM energy propagating in the formation. See also B. Clark et al., *Electromagnetic Propagation Logging While Drilling: Theory and Experiment*, SPE SIXTY-THIRD ANNUAL TECHNICAL CONFERENCE AND EXHIBITION, paper 18117, 1988.

U.S. Pats. Nos. 4,899,112 and 5,594,343 (both assigned to the assignee of the present invention) disclose conventional well logging tools used to evaluate the resistivity of formations in LWD operations. The '112 patent concerns the determination of formation resistivity at different radial depths of investigation with the use of receivers placed between two transmitters. The '343 patent concerns the determination of formation properties at different radial depths of investigation with the use of multiple transmitters at various spacings from a pair of receivers.

If the antenna coils on these tools were perfectly configured and balanced in a theoretically ideal system, the EM energy emitted by the coils would propagate in a mode known as a transverse electric ("TE") mode, of the type generated by an ideal vertical magnetic dipole. However, under actual operating conditions, there are various factors that give rise to the generation of significant undesired EM field components. One approach to alleviating this problem is with the use of antenna shields to reduce the transmission and/or reception of spurious and unwanted EM field components. These shields are typically used in conjunction with each coil on the tool.

U.S. Pats. Nos. 4,536,714 and 4,949,045 (both assigned to the assignee of the present disclosure) disclose conventional antenna shields employed in these tools to provide mechanical protection for the coils and to guarantee the passage of desired EM field components. As shown in FIG. 1a, these shields 10 are in the form of a metal cylinder that has slots 12 in the axial direction. The slot 12 pattern allows the azimuthal electric field ($E\phi$) component of the EM energy to pass, but prevents radial ($Er$) and axial ($Ez$) electric field components from passing through the shield, either from within (in the case of a transmitter) or from without (in the case of a receiver). An alternative viewpoint is to represent each axial slot 12 as an axial magnetic dipole, as shown in FIG. 1b. These magnetic dipoles are sensitive to axial magnetic fields ($Bz$), but they are not sensitive to azimuthal magnetic ($B\phi$) fields. The shielded coils are thus rendered insensitive to parasitic transverse magnetic ("TM") EM fields associated with borehole is modes, and which have radial ($Er$) and axial ($Ez$) electric fields and azimuthal magnetic fields ($B\phi$).

An emerging technique in the field of well logging is the use of tools incorporating tilted antennae, i.e., where the coils are tilted with respect to the tool axis. These apparatus are configured as such in an effort to alter the direction of the downhole measurement. U.S. Pat. No. 5,508,616 describes an induction tool incorporating tilted transmitter and receiver coils. PCT Application WO 98/00733, Bear et al., describes a logging tool including triaxial transmitter and receiver coils. U.S. Pat. No. 4,319,191 describes a logging tool incorporating transversely aligned transmitter and receiver coils. U.S. Pat. No. 5,115,198 describes a tool including a triaxial receiver coil for measuring formation properties. U.S. Pat. No. 5,757,191 describes a method and system for detecting formation properties with a tool including triaxial coils. Common to these apparatus and techniques, however, is the need to manipulate the antenna itself in order to achieve any directionality of measurement.

It is desirable to obtain an apparatus that can provide directional downhole measurements without being limited to the use of tilted coils. Further, it is desired to implement a system that can provide an azimuthally focused downhole measurement with the use of tilted or non-tilted coils.

2. SUMMARY OF THE INVENTION

A method and apparatus are provided for making directional measurements of the characteristics of earth formations surrounding a borehole. The disclosed methods and apparatus include the use of a new antenna shield designed to provide selective attenuation of at least one electromagnetic energy field component as the component interacts with the shield to rotate the axis of the antenna's magnetic dipole, thereby altering the antenna's envelope of influence to electromagnetic energy.

In a first aspect of the invention, a specific tool configuration is provided for use during or after drilling of a borehole.

In a second aspect of the invention, a system is provided for making directional measurements of formation characteristics during the drilling of a borehole.

In a third aspect of the invention, another specific tool configuration is provided. The tool includes a pair of receiver coils for making a differential measurement of the relative phase shifts and attenuation of the received signals.

In a fourth aspect of the invention, another specific tool configuration is provided. This configuration utilizes two transmitter coils and two receiver coils to provide for borehole compensated measurements.

In a fifth aspect of the invention, a method is provided for making borehole compensated measurements of earth formations surrounding a borehole.

In a sixth aspect of the invention, a method is provided for making directional measurements of earth formations surrounding a borehole.

In a seventh aspect of the invention, another method is provided for making directional measurements of earth formations surrounding a borehole.

3. BRIEF DESCRIPTION OF THE DRAWINGS

Other aspects and advantages of the invention will become apparent upon reading the following detailed description and upon reference to the drawings in which:

FIGS. 19a–19b are schematic diagrams showing electromagnetic propagation ray patterns associated with a borehole compensation technique.

4. DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

Figure 1A:
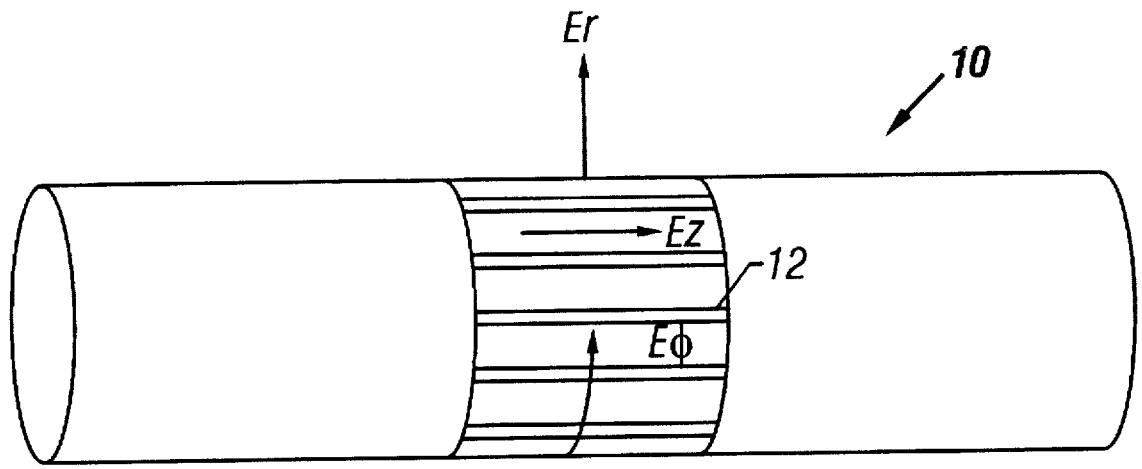
FIG. 1a is a schematic diagram of a conventional cylindrical shield with axial slots. Directed arrows are representative of the interaction between the shield and the electric field components of incident electromagnetic energy.
Figure 1B:
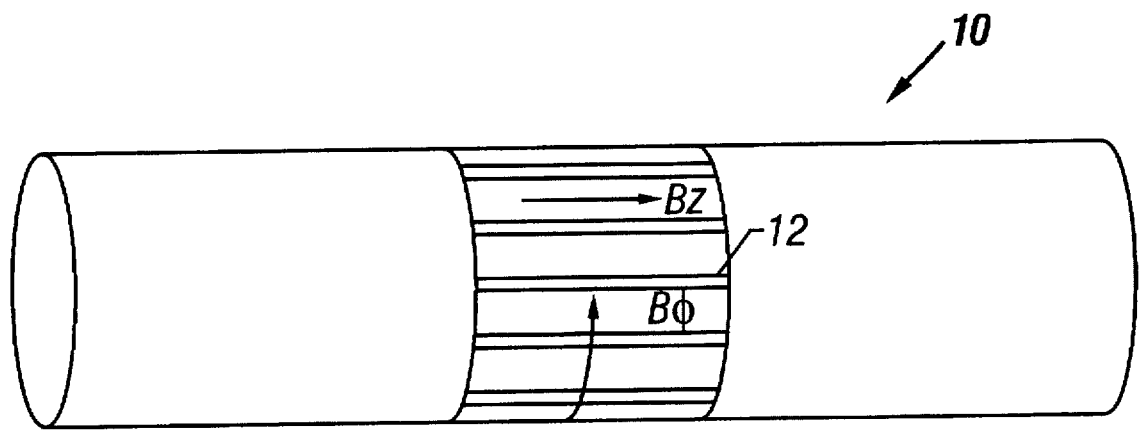
FIG. 1b is a schematic diagram of a conventional cylindrical shield with axial slots. Directed arrows are representative of the interaction between the shield and the magnetic field components of incident electromagnetic energy.
Figure 2A:
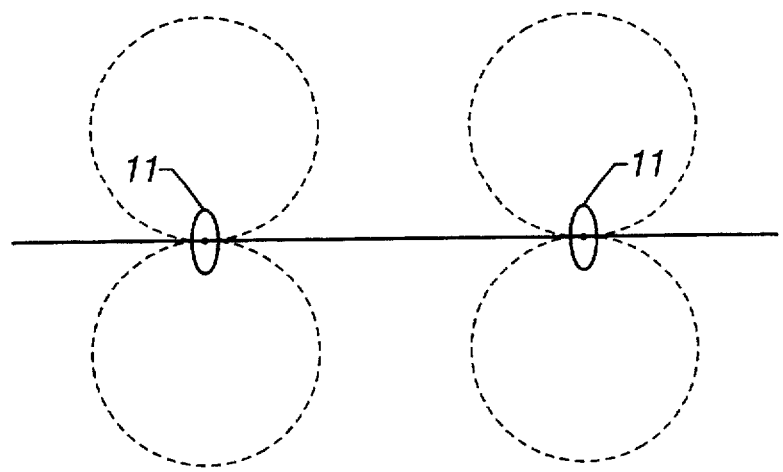
FIGS. 2a–2c are schematic diagrams of the general volumes of influence to electromagnetic energy obtained with different configurations of antenna coils mounted along a support member.
Figure 2B:
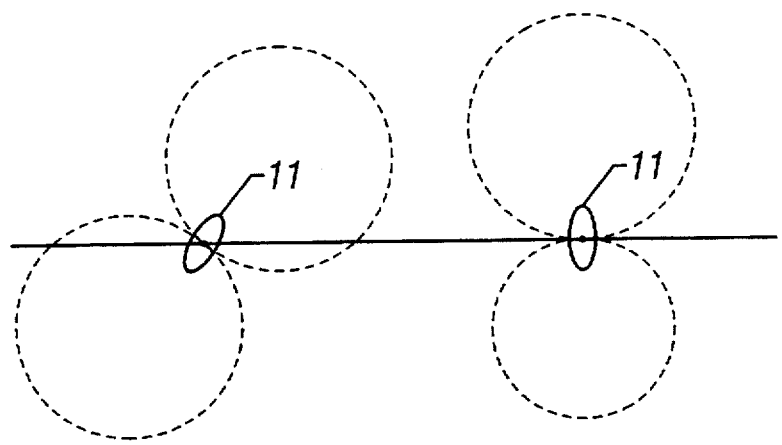
Figure 2C:
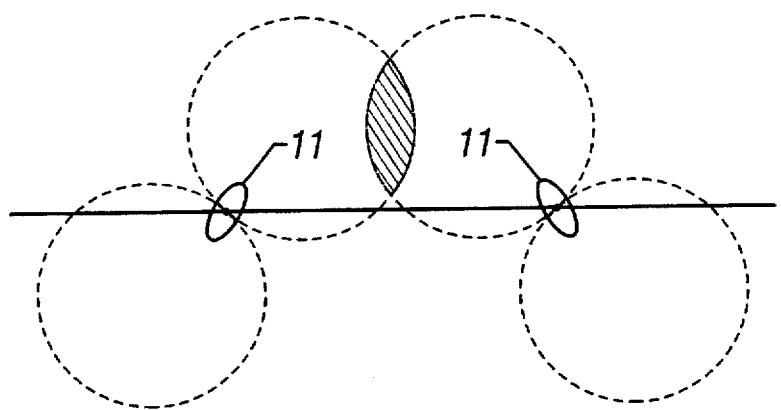

As described above, an energized transmitter coil on a logging tool will irradiate the surrounding formation with EM energy. The EM energy is sensed by one or more receiver coils on the tool. FIG. 2a shows the general field of coil 11 sensitivity to EM energy for a typical non-tilted (axial) coil 11 configuration. FIG. 2b shows the general field of coil 11 sensitivity for a coil 11 configuration where one coil 11 is tilted relative to the tool axis (represented by the solid line). FIG. 2c shows the general field of coil 11 sensitivity for a coil 11 configuration where both coils 11 are tilted relative to the tool axis. Maximum sensitivity may be achieved when both coils 11 are tilted, as represented by the shaded region of overlap in FIG. 2c. FIGS. 2a–2c show that by tilting the coil 11, the axis of its magnetic dipole is rotated, thereby altering the coil's 11 field of influence to EM energy.

By selectively directing the sensitivity of a coil 11, azimuthally focused formation measurements can be obtained with accuracy. In addition to wireline logging, this technique is applicable to other operations including performance (straight-hole) drilling; directional (where the borehole path is steered to follow a planned geometric course) drilling; and geosteering (where the borehole path is steered to optimize its local position within a reservoir).

4.1 Antenna Shields

As discussed above, conventional shields used in well tools universally have slots that are aligned along the longitudinal axis of the tool. The orientation of the slots is perpendicular to the electric field generated by the coil within or the field that is to be detected by the receiver. If the incident field has an unwanted component of the electric field that lies along the slot, then currents will flow in the metal to cancel that field and only the normal component will remain. For conventional logging tools, the desired electric field is azimuthal, and longitudinal slots allow that field to pass. If the coil was wound at an angle $\theta$ to the axis of the tool, then the desired electric field is no longer azimuthal, but rather has both azimuthal and longitudinal components that vary as a function of the azimuthal position.

Figure 3:
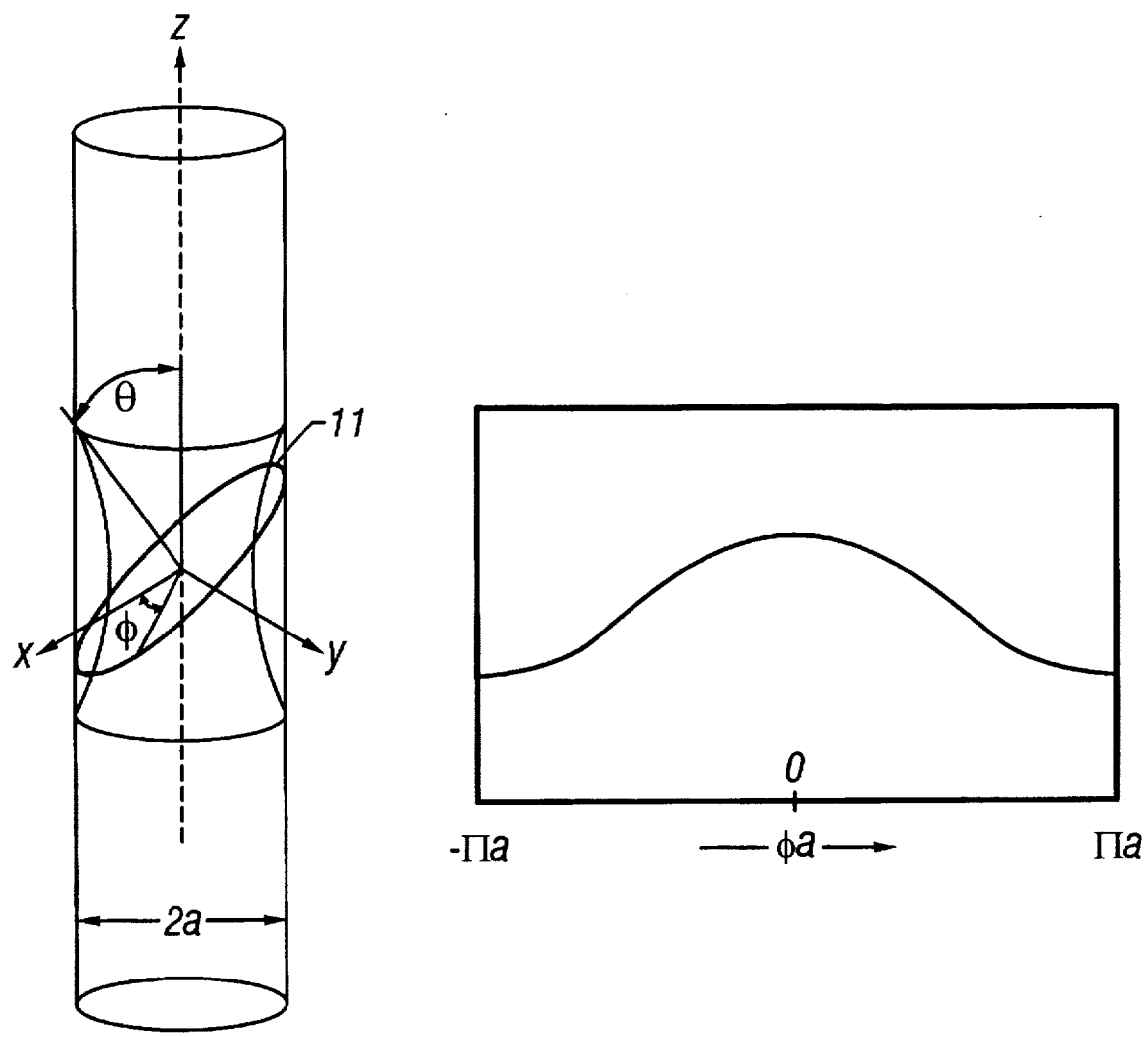
FIG. 3 is an illustration of a coil wound at an angle θ to the longitudinal axis of a well tool. Also depicted is a view of the tilted coil as projected onto a two-dimensional surface.

FIG. 3 illustrates a coil 11 wound at an angle $\theta$ to the longitudinal axis (represented by dashed lines) of a tool and having radius a. Projecting the coil 11 onto a two-dimensional surface as shown, the height of the coil 11 is described by a sinusoidal function of the azimuthal angle $\phi$ around the tool:

$$f(\phi) = a \tan\theta \cos\phi. \quad (1)$$

An actual coil would probably have multiple windings, described by equation (1), but with an additional term $p\phi$, where p is the pitch. Effective shields for such coil configurations should preserve both the mechanical advantages and the EM advantages offered by conventional shields.

4.2 Sloped Slot Pattern

Figure 4:
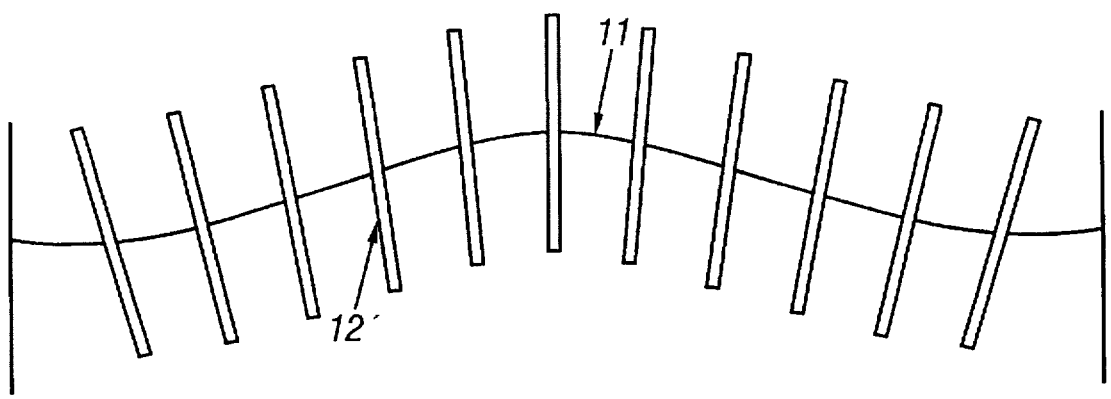
FIG. 4 is an illustration of a sloped slot pattern superimposed onto a tilted coil and projected onto a two-dimensional surface. The slots are maintained perpendicular to is the coil winding.

A shield to let pass the desired EM field components, and attenuate the undesired ones, should have at least one sloped slot that is sloped at an angle $\theta$ with respect to the tool axis. A sloped slot pattern for a tilted coil 11, projected onto a two-dimensional surface, is shown in FIG. 4. The slots 12' are perpendicular to the coil 11 at the intersection of the slot 12' and coil 11. This allows the electric field component that is parallel to the coil 11 to pass through the shield with minimal attenuation. This electric field will have azimuthal and axial components, but no radial component. The slope of the slot 12' is given by $$1/(a \tan\theta \sin\phi). \quad (2)$$

Alternatively, one can represent the slots 12' as point magnetic dipoles on the surface of a conducting cylinder (not shown). The location of each magnetic dipole is given by equation (1), and their orientation is given by equation (2). Each individual magnetic dipole has an axial component and a smaller azimuthal component.

Figure 5:
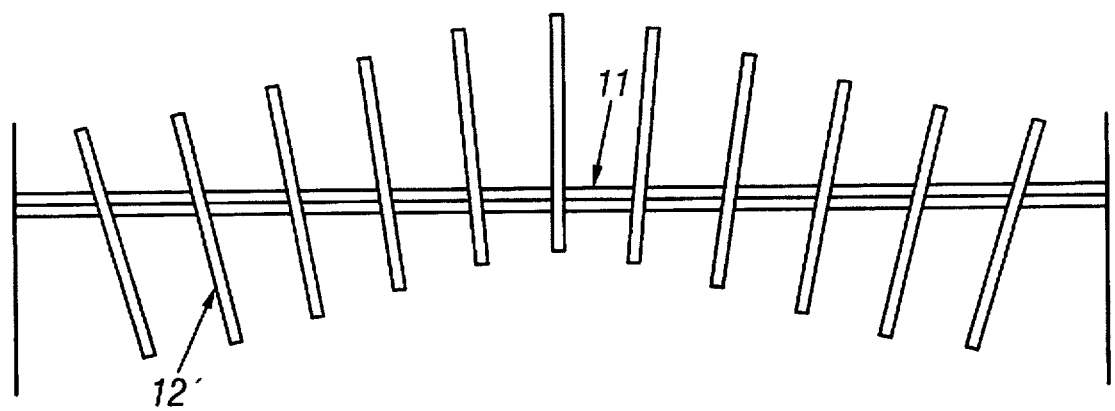
FIG. 5 is an illustration of a sloped slot pattern superimposed onto a non-tilted (axial) coil and projected onto a two-dimensional surface.

While the above discussion has assumed that the coil under the shield is tilted at an angle $\theta$ with respect to the tool axis, the shields 14 of the present invention can also be used with an axial coil 11. With this configuration, the axis of the magnetic dipole of the coil can be selectively rotated. FIG. 5 illustrates a sloped slot 12' pattern superimposed onto an axial coil 11 and projected onto a two-dimensional surface. This configuration will deviate from the configuration of FIG. 4.

Figure 6:
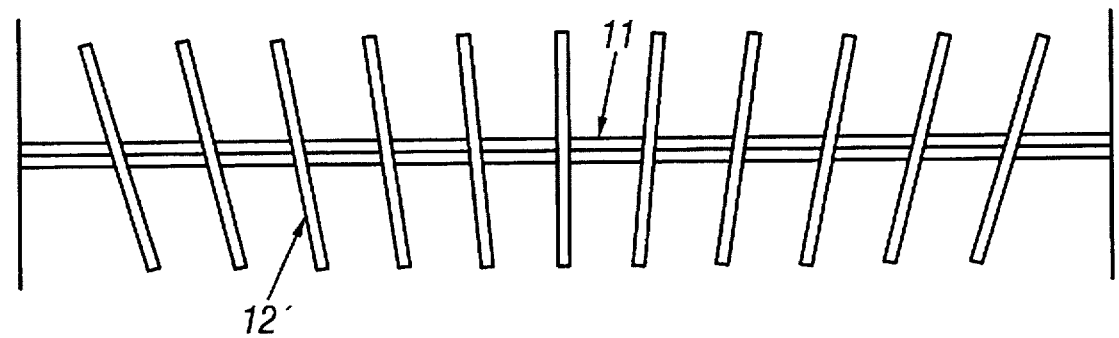
FIG. 6 is a diagram of the sloped slot pattern of FIG. 5 with the slots maintained centered over the coil windings.

As shown in FIG. 5, the slots 12' are no longer perpendicular to the coil 11 windings. This may affect the relative strength of the transverse magnetic dipole ("TMD") component to the axial magnetic dipole component. One approach to minimize these effects would be to maintain the slots 12' centered over the coil 11, as shown in FIG. 6. FIG. 6 also shows a sloped slot 12' pattern superimposed onto an axial coil 11 and projected onto a two-dimensional surface. Although the coils 11 in FIGS. 5 and 6 are shown comprising multiple windings, it will be understood by those skilled in the art that the shields of the present invention are effective with coils 11 composed of one or more windings.

While FIGS. 4–6 show straight slots 12', in general the slots 12' are curved in order to maintain the direction of the slots 12' perpendicular to the directions of the winding(s) or to keep them perpendicular to the desired direction of the electric field that is to pass through the shield without attenuation. All of the shield designs disclosed herein can be used in conjunction with either tilted or conventional axial coils. Surrounding an axial coil 11 with a shield of the present invention will produce transverse magnetic fields. Only the component of the electric field perpendicular to the slot 12' will pass through the shield; the components parallel to the slot 12' will be attenuated. The electric field that passes through the slots 12' is in the direction that would result from a true tilted coil. Basically, the shield 14 functions as a polarizer that passes components of the EM field corresponding to a magnetic dipole oriented at an angle tilted relative to the tool axis. It will be recognized that this description is somewhat simplified and that further elaboration of the behavior of a shield 14 depends in a complicated way upon the details of the tool construction. Dependence upon such parameters as number of slots 12', their height, width and orientation, the frequency of operation of the tool, of the electrical properties of the materials or the details of the coil windings can be obtained principally through sophisticated modeling techniques or through experimentation as known by those skilled in the art.

Figure 7:
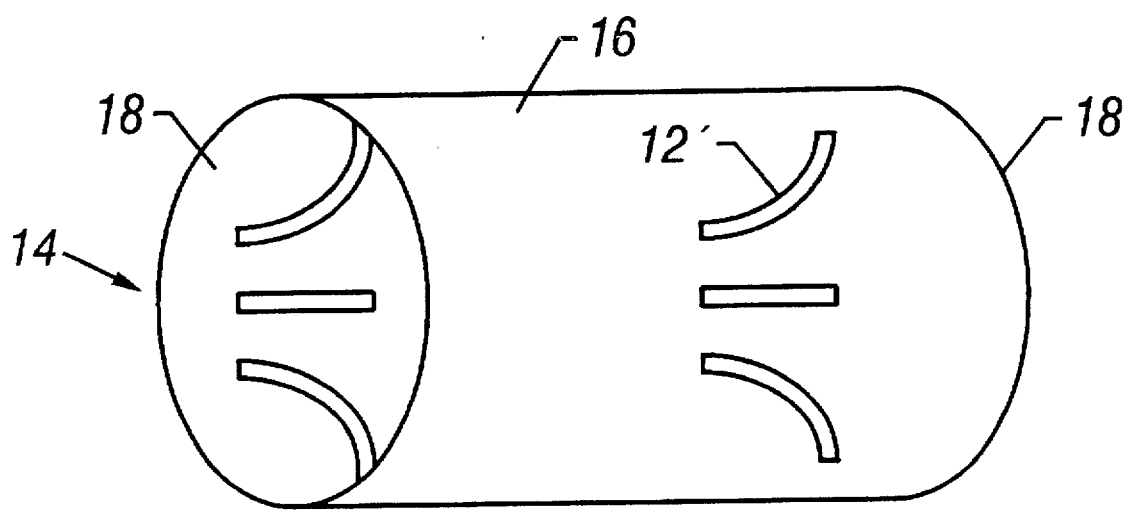
FIG. 7 is a schematic diagram of a cylindrical shield in accord with the invention.

FIG. 7 shows an embodiment of a shield 14 of the present invention. One embodiment of the shield 14 entails a hollow body 16 formed of a conductive material, typically metal. The shield 14 has apertures 18 at its ends through which the tool body passes (not shown). The hollow body 16 may be open-ended or closed-ended. The body 16 is generally formed in the shape of a surface of revolution. A cylinder is preferred, although other shapes, such as an ellipsoid of revolution may be employed. Preferably, a shield 14 will independently surround each coil 11 on a tool. The shield 14 may be mounted on the tool in a suitable manner as known in the art.

The EM radiation pattern around a logging tool may be affected by the tool itself, so optimum shield 14 operation may require fine tuning the exact slot 12' pattern. Modeling shows that borehole eccentricity can have a large deleterious effect on a measurement using TMDs. Eccentered TMDs can couple directly into TM borehole modes via the TM mode's azimuthal magnetic field ($B\phi$). Since a tilted coil 11 can be represented as a vector sum of an axial magnetic dipole and a transverse magnetic dipole, it will also be susceptible to large eccentricity effects.

Figure 8A:
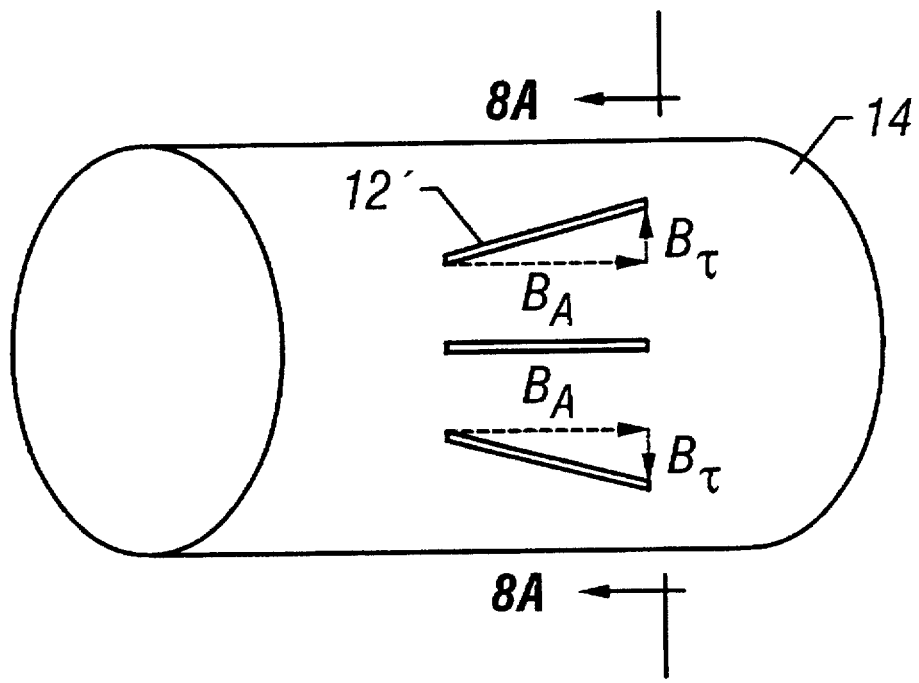
FIG. 8a is a schematic diagram of a cylindrical shield in accord with the invention. Dashed arrows represent the axial magnetic dipole and transverse magnetic dipole components associated with the slot pattern of the shield.

However, the shield 14 configurations of the present invention will provide some immunity to the TM mode, so the eccentricity effects may be reduced in severity. FIG. 8a shows the axial magnetic dipole component $B_A$ and the transverse magnetic dipole component $B_T$ associated with each slot 12'. As shown in FIG. 8a, the slot 12' pattern provides for some cancellation of opposing transverse magnetic dipole components $B_T$.

Figure 8B:
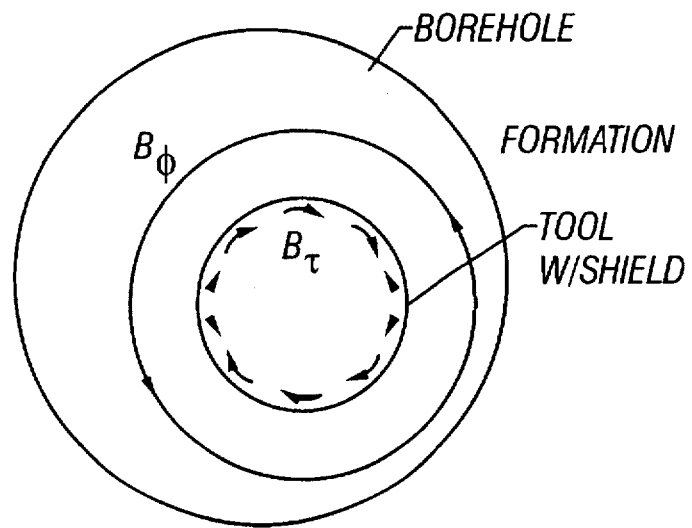
FIG. 8b is an overhead cross-section of a tool with the shield of FIG. 8a as seen along line A—A when the tool is in a borehole.

FIG. 8b is an overhead view of a tool with the shield of FIG. 8a as seen along line A—A when the tool is in a borehole. As shown in FIG. 8b, the TM mode's azimuthal magnetic field (Bφ) may couple to the transverse magnetic dipole components $B_T$ of the slots 12'. The TM mode's radial electric field (Er) will not penetrate the shield 14, so the coil 11 will not sense this.

The transverse magnetic dipoles vary with azimuth φ as sin φ. The TM mode's magnetic field may be written as $$B_\phi(\phi) = B_0 + B_1 \sin\phi + B_2 \sin 2\phi + \ldots \quad (3)$$

The field $B_0$ will not be detected by the coil 11 because $B_0$ is an even function of φ, while the transverse magnetic dipoles are an odd function of φ. The same is true for $B_2 \sin 2\phi$. However, $B_1 \sin\phi$ is an odd function of φ, so the coil 11 will detect it. Assuming that the conductivity of the tool is many orders of magnitude larger than the borehole fluid or the formation, the azimuthal magnetic field (Bφ) will not vary much with azimuth φ. Hence, $B_0 >> B_1$, $B_2$, so that the TM coupling to the slots 12' will be very small on average.

Modifications may be made to the shield 14 or the coil 11 to alter the azimuthal amplitude of incident EM energy or the angle of rotation of the magnetic dipole. Multiple shields 14 may be overlaid coaxially around a coil 11. Combinations of sloped and axial slots of varying length, width, thickness, orientation, symmetry, density, or spacing may be formed on a shield 14. The sloped slots 12' may have equal or varied slope angles. The slots 12' may be partially or entirely filled with some sort of lossy (i.e., conductive) material. A conductive element, such as a metallic strap or wire, may be connected between the sides of a slot 12' to partially short out the slot 12'.

A shield 14 of the invention may also be formed comprising two halves or several sections configured to form a surface of revolution when combined (not shown). Such a configuration may further comprise one section or one half of the shield 14 being electrically isolated from the other half or other sections. The spacing between the coil and its support means or the spacing between the coil and the shield 14 may also be varied. It will be appreciated by those skilled in the art having the benefit of this disclosure that other modifications may be employed to increase the efficiency of the shield 14.

4.3 Strip Shield

Figure 9:
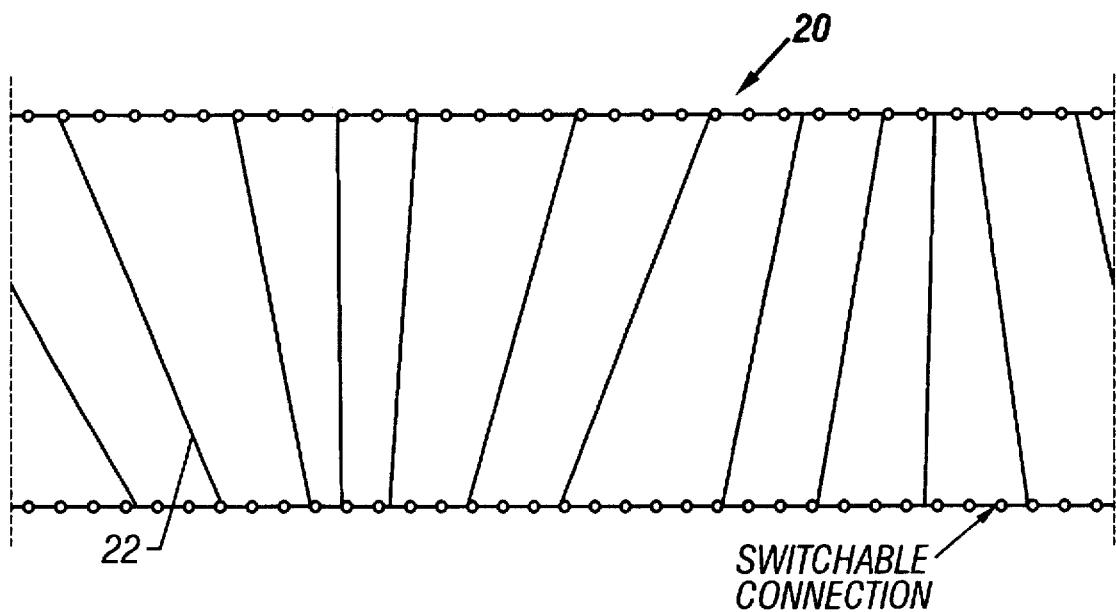
FIG. 9 is a schematic diagram of a shield composed of a strip in accord with the invention. The strip is shown projected onto a two-dimensional surface.

FIG. 9 illustrates another shield embodiment of the present invention. A shield may be implemented in the form of a strip 20, also referred to as a flex circuit. The strip 20 is shown projected onto a two-dimensional surface for clarity of illustration. An effective strip 20 may be formed of any suitable non-conductive material that can be adapted to coaxially surround a coil. The strip 20 is preferably flexible, but it may also be formed of a rigid material. The strip 20 contains at least one conductive element 22, preferably a multitude of elements 22. The conductive elements 22 may be formed of fine strips of copper or other suitable conductive materials.

As described above, a shield incorporating sloped slots may be used to rotate the magnetic moment of a coil 11. Thus, the conductive elements 22 are disposed in the strip 20 such that each element 22 is sloped at an angle with respect to the tool axis when the strip is mounted on the tool to surround a coil 11. Since the strip 20 is non-conductive (unlike the shield embodiments described above), the elements 22 must also be configured to form a loop around the coil when the strip surrounds the coil. The loop provides the path in which currents can flow around the coil in order to rotate the axis of the magnetic dipole. The strip 20 provides selective attenuation of the EM energy emitted or received by a coil 11 when a complete loop is formed around the coil 11 by the conductive element 22.

Figure 10:
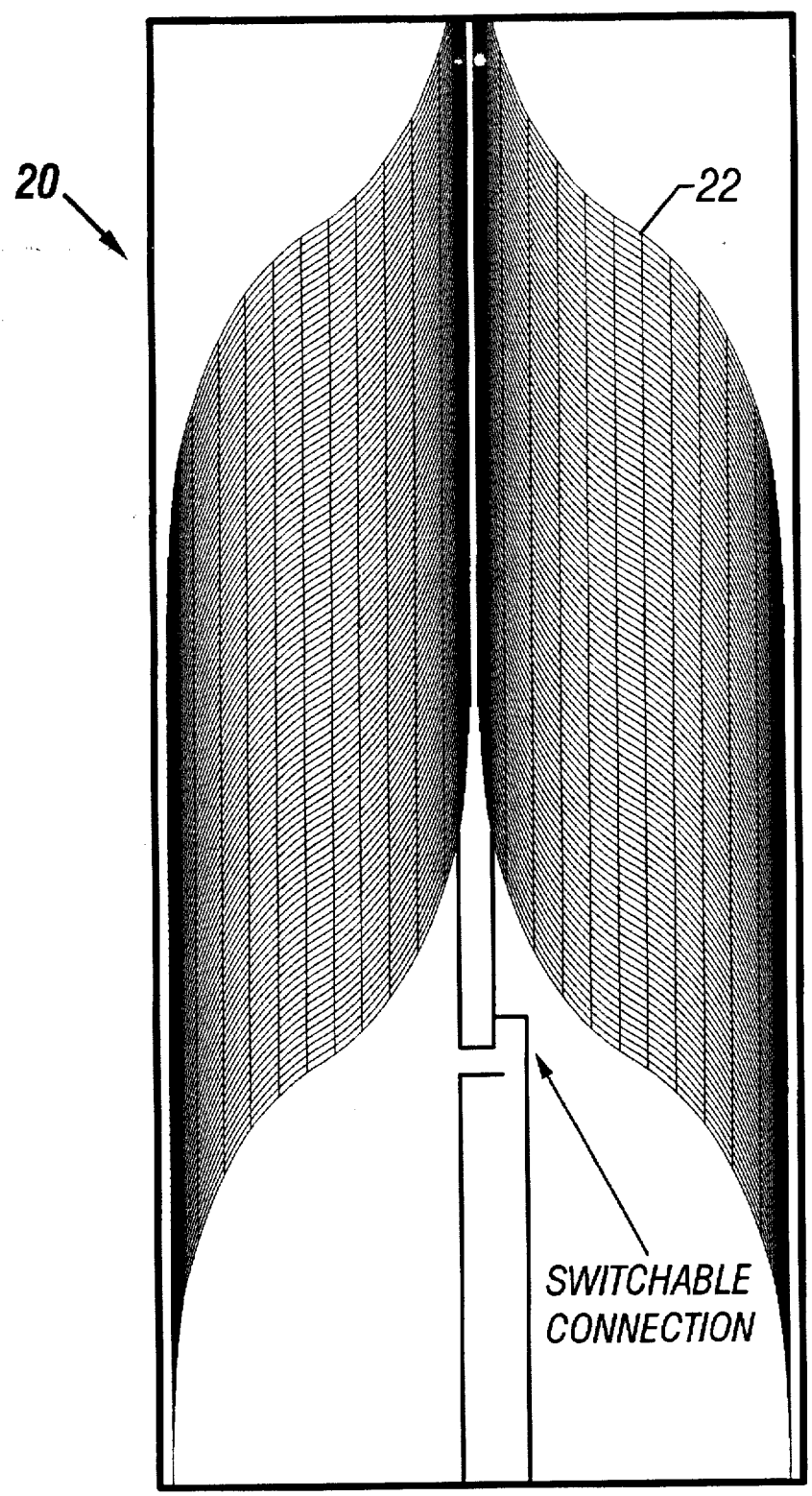
FIG. 10 is an unwrapped view of a shield composed of a strip containing multiple conductive elements in accord with the present invention.

A switchable connection is provided in the strip 20 to selectively open or close the loops formed by the conductive elements 22, as illustrated in FIG. 9. This connection may be a series of connections (FIG. 9) or only one connection (FIG. 10). The connection(s) may also be located at any suitable point in the circuit. When the connection is closed, the element 22 acts to rotate the magnetic dipole of the coil. When it is open, it has no effect. One form of a switchable connection utilizes a MosFET switch to open or close the current path around the coil. Other suitable means may be utilized to form the switchable connection(s) as known in the art.

The strip 20 is constructed so that the conductive elements 22 are everywhere perpendicular to the current in the coil 11 windings. The conductive elements 22 are perpendicular to the direction of the desired electric field, whether the strip 20 is used with a tilted coil 11 or a conventionally wound one. FIG. 10 shows an embodiment of a strip 20 containing conductive elements 22 in accord with the invention. The conductive elements may be embedded, glued, or affixed to the flexible strip in any suitable manner as known in the art.

Figure 11:
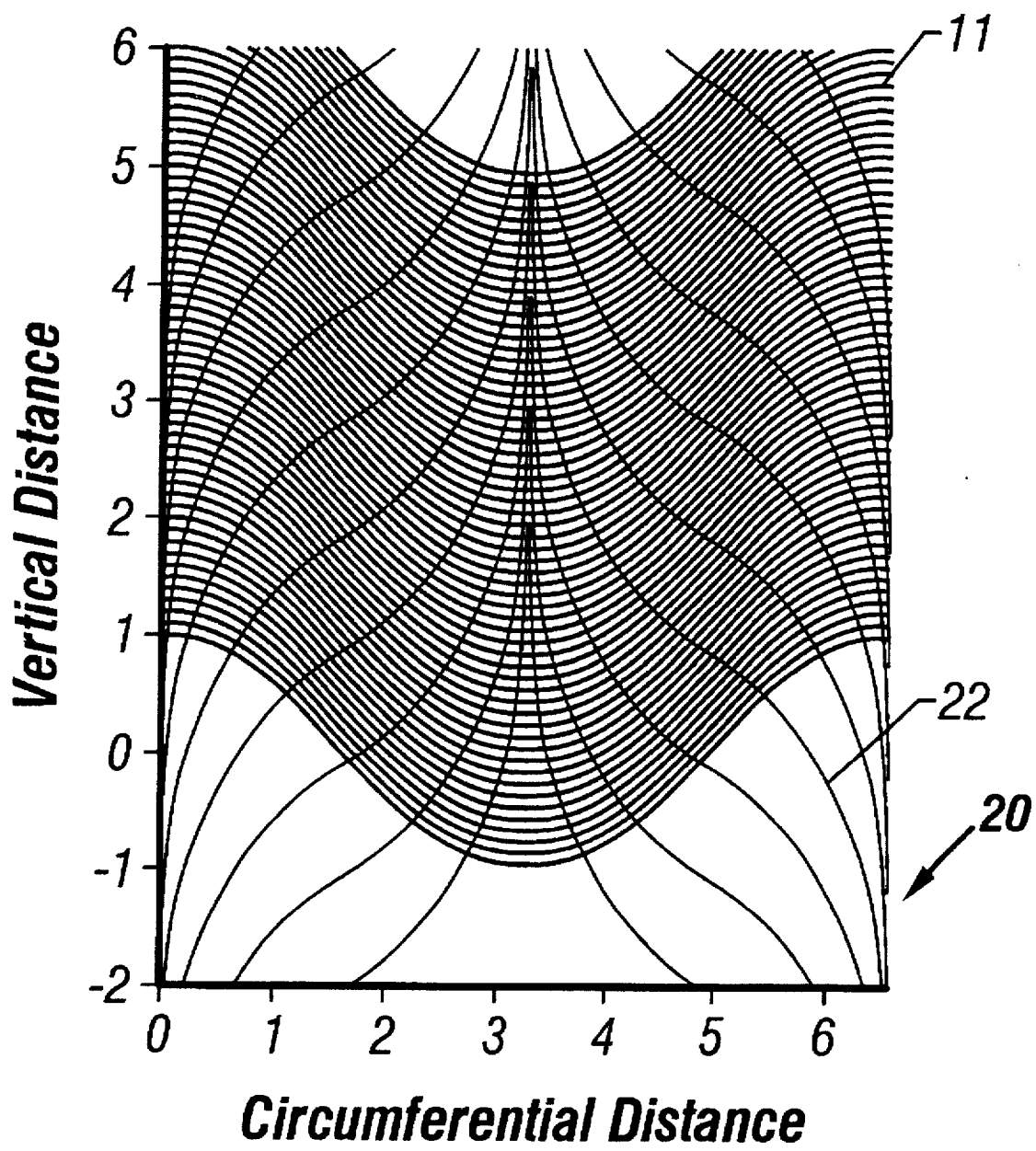
FIG. 11 is a schematic diagram of the shield of FIG. 10 superimposed over the windings of a tilted coil in accord with the present invention.

In addition to providing selective attenuation of EM energy components, the strip 20 acts as a Faraday shield to reduce capacitive coupling between coils, without attenuating the desired components of the magnetic field. FIG. 11 shows the strip 20 of FIG. 10 superimposed over the windings of a tilted coil 11. As shown in FIG. 11, the conductive elements 22 are everywhere perpendicular to the coil 11 windings. Although FIG. 11 shows the superposition of a strip 20 over a coil 11, the same pattern applies to the superposition of a cylindrical shield 14 with sloped slots 12' over a coil 11. The simplified coil 11 and strip 20 described above can be overlaid to create a set of basis magnetic dipoles. These can be used to construct a coil structure that provides selective three-dimensional measurement capability.

The modifications described above may also be made to the strip 20 or the coil 11 within to alter the azimuthal amplitude of incident EM energy or the angle of rotation of the magnetic dipole. Multiple layers of conductive elements 22 having different directions of magnetic dipole moments may also be disposed on the strip 20. This would allow the use of a single axial coil as a transmitter or receiver and by closing the switchable connection(s) on the strip 20, different rotations of the magnetic moment is could be achieved. Alternatively, multiple strips 20 could be overlaid coaxially to surround a coil.

A shield incorporating a sloped slot 12' or sloped conductive element 22 will henceforth be referred to as a "new shield," and an antenna surrounded by a new shield as "newly shielded." It will be understood that every reference to a new shield encompasses all the embodiments described above, including the various modifications to those embodiments.

4.4 Directional Logging Apparatus/System

Figure 12:
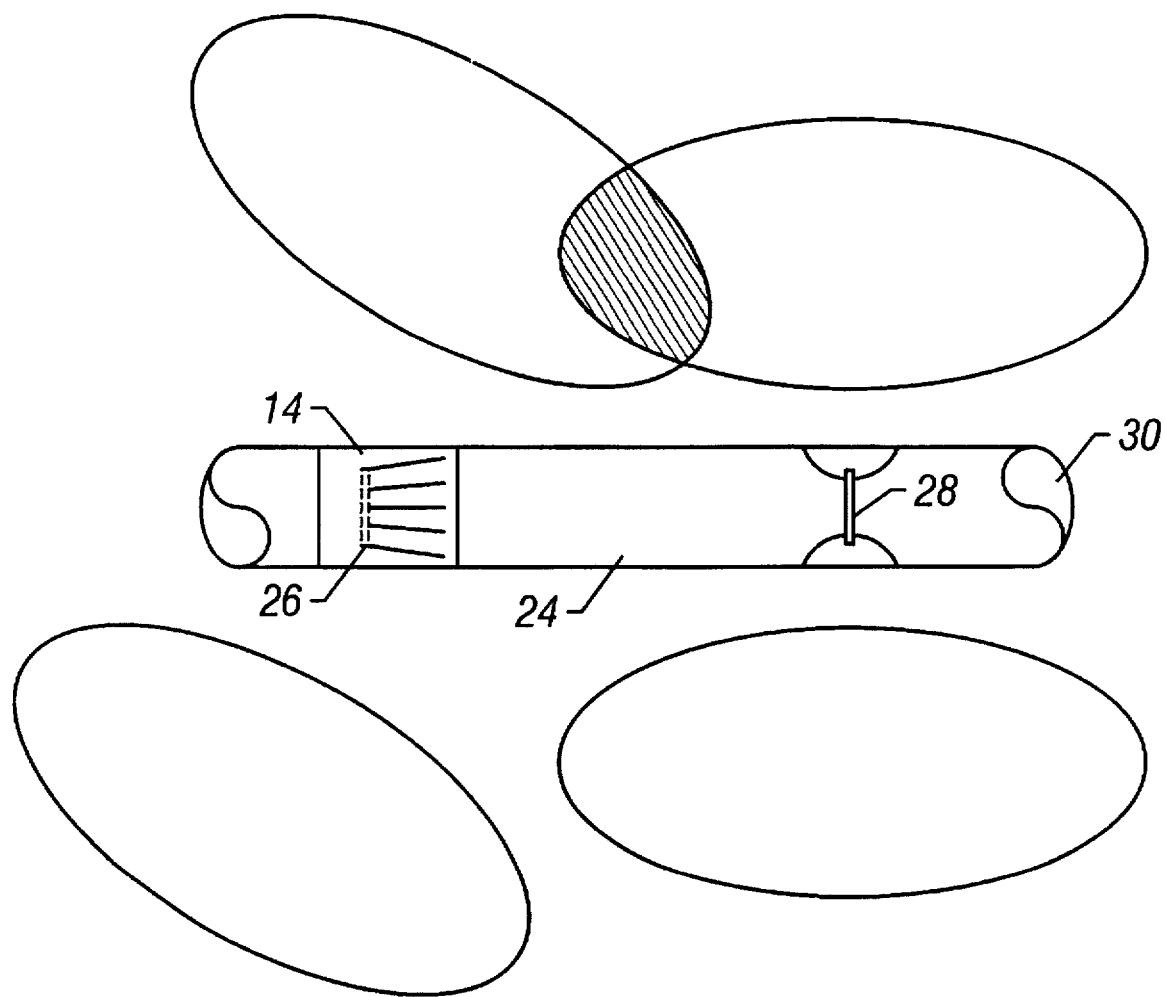
FIG. 12 is a schematic diagram of a directional logging tool configuration in accord with the invention.

FIG. 12 shows an embodiment of the invention. A tool 24 is shown with a transmitter coil 26 and a receiver coil 28 mounted on a longitudinal support means 30. The longitudinal support means 30 is preferably in the form of an elongated metallic mandrel, however other support structures may be employed, including coiled tubing or nonmetallic pipes as known in the art. As shown in FIG. 12, the transmitter coil 26 is surrounded by a new shield 14 to alter the orientation of the EM energy radiated by the coil 26, thereby varying the tool's 24 field of sensitivity to azimuthal variations in formation characteristics. The direction of maximum azimuthal sensitivity is indicated by the shaded region of overlap in FIG. 12. The receiver coil 28 is preferably surrounded by a conventional shield (not shown).

In operation, activation of the transmitter and receiver coils 26, 28 is implemented in a manner well known by those skilled in the art. The voltage data (corresponding to relative phase shifts and amplitude attenuation between the transmitted and received EM energy) are produced and processed by the various embodiments of the invention to evaluate the formation characteristics as described in the '112 and '343 patents. By varying the distance between the transmitter coil 26 and the receiver coil 28, the depth of investigation may be altered.

It will be understood that alternative tool 24 configurations may include multiple transmitter coils 26 and/or multiple receiver coils 28. An alternative configuration may also comprise the use of a transmitter 26 and/or receiver coil 28 mounted with its axis tilted from the longitudinal axis of the support means 30, in addition to having a new shield 14 surrounding either coil or both (not shown). Another alternative configuration may include both coils 26, 28 being surrounded by new shields 14 (not shown). The tool 24 of FIG. 12 may be implemented in a wireline or LWD operation, with the measured data being sent to the surface as known in the art.

Figure 13:
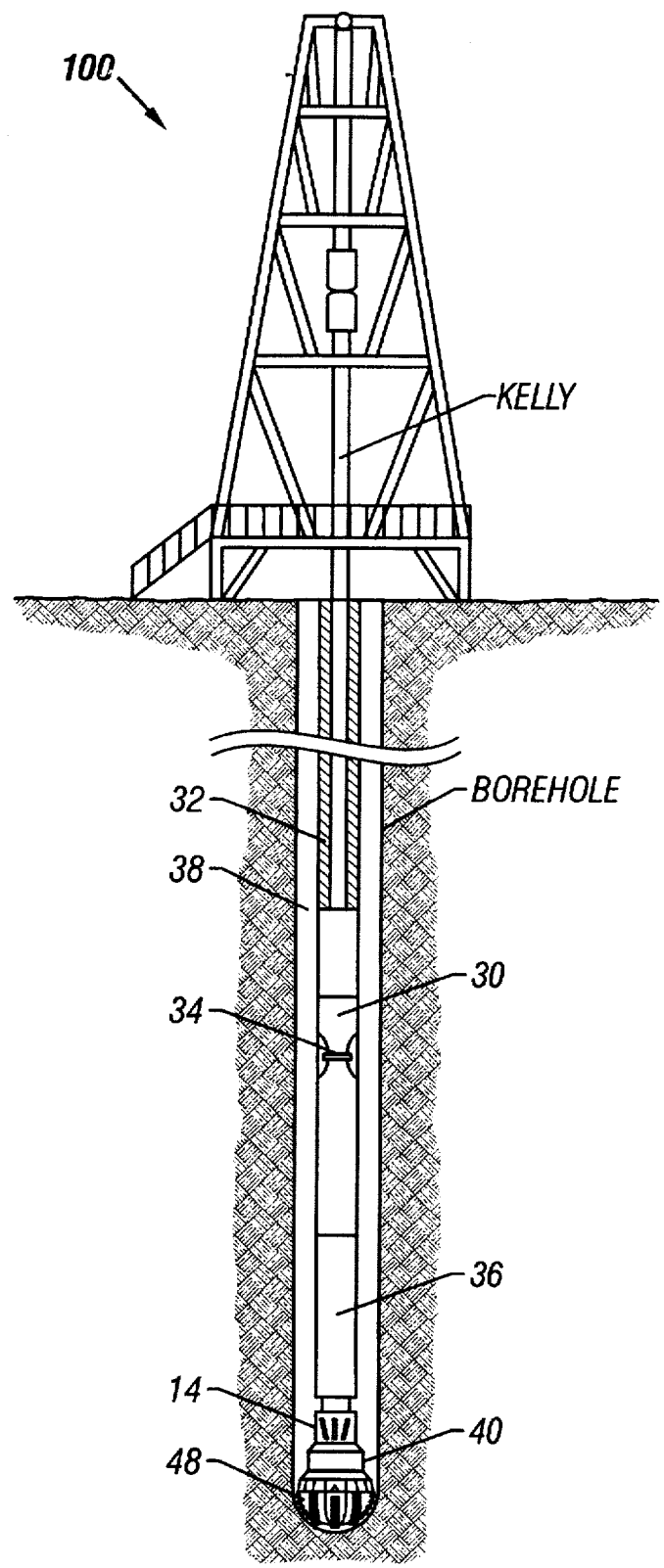
FIG. 13 is an illustration showing an LWD system at the end of drill string in accord with the invention.

FIG. 13 shows another embodiment of the invention. An LWD system 100 includes a first sub 30 connected at the bottom end of a drilling string 32. The first sub 30 contains at least one transmitter or receiver coil 34. The first sub 30 may be a conventional LWD tool, such as the ones disclosed in the '112 and '343 patents, with each transmitter and/or receiver coil 34 being activated as described therein. The first sub is connected to a drilling motor 36. The drilling motor 36 may be a conventional motor as known in the art. Such motors 36 are typically powered by drilling fluid circulated down through the bore of the drill string 32 and back up to the surface via the borehole annulus 38. Below the motor 36 is a second sub 40. The second sub 40 also contains at least one transmitter or receiver coil 34 (not shown) surrounded by a new shield 14.

Figure 14:
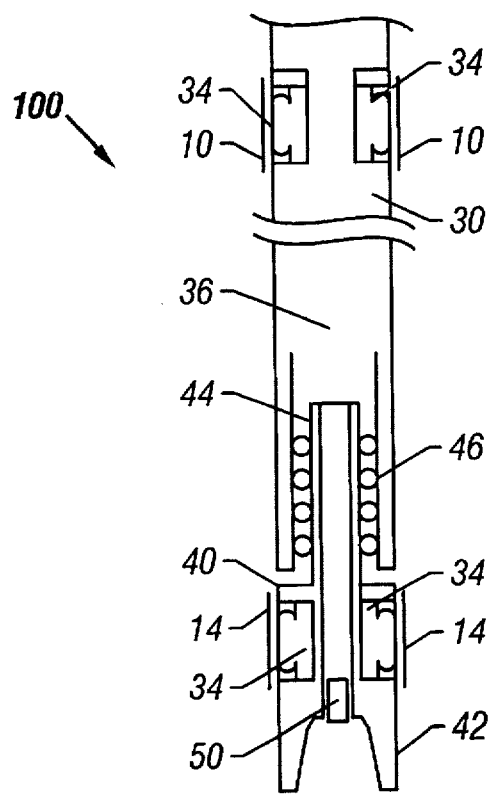
FIG. 14 is a side view of an embodiment of the LWD system of FIG. 11.

Turning to FIG. 14, a cross-section view of the LWD system 100 components is shown. As seen in FIG. 14, the second sub 40 has a bit box 42 at the bottom portion of a drive shaft 44. The drive shaft 44 is connected to the drilling motor 36 via an internal transmission assembly (not shown) and a bearing section 46. A drill bit 48 is connected at the bottom end of the bit box 42 (see FIG. 13). The motor 36 rotates the shaft 44, which rotates the bit box 42, thus rotating the drill bit 48 during drilling.

Figure 15:
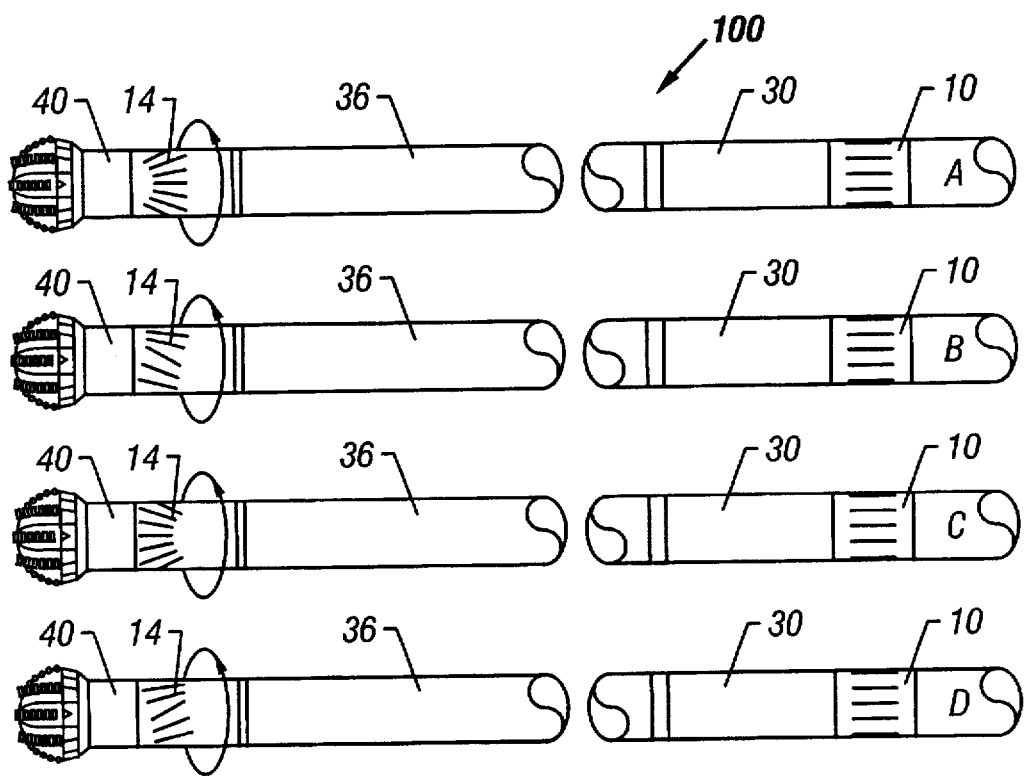
FIG. 15 is a schematic diagram of an embodiment of the LWD system of FIGS. 13 and 14 in accord with the invention.

Effective directional measurements of the formation may be obtained by mounting a transmitter coil 34T on the second sub 40 and a receiver coil 34R on the first sub 30. FIG. 15 shows such a system 100 configuration. FIG. 15 shows four orientations (A–D) of the system 100. The underlying coils 34T, 34R are not shown in FIG. 15. By placing a new shield 14 around the transmitter coil 34T, the axis of the coil's 34T magnetic dipole is rotated as described above; thus focusing the coil's 34T field of EM radiation. The receiver coil 34R is preferably surrounded by a conventional shield 10.

If the system 100 is in a homogeneous medium far from bed boundaries, then the amplitude of the EM waves detected at the receiver coil 34R will not vary with the instantaneous azimuth of the rotating second sub 40. However, if the system 100 is in a horizontal well with an adjacent bed boundary, then the detected amplitude will be modulated according to the RPM of the motor 36. Suppose the system 100 is in a resistive bed located just above a conductive bed. When the transmitter coil 34T is oriented as shown in orientation B, the amplitude of the detected EM signal will be a maximum (because the coil 34T is broadcasting upward into the resistive formation). When the transmitter coil 34T is aligned as in orientation D, the amplitude will be at a minimum (because the coil is broadcasting downward into a conductive formation). When the transmitter coil 34T is aligned as in orientation A, the direction of maximum sensitivity is out of the page. When the transmitter coil 34T is aligned as in orientation C, the direction of maximum sensitivity is into the page.

If the orientation of the newly shielded transmitter coil 34T is known when the coil 34T is transmitting, then the direction to the adjacent bed is obtained. This requires a means for determining the instantaneous azimuth of the second sub 40 as it rotates about the borehole axis. As known in the art, the use of one or more magnetometers 50 incorporated into the second sub 40 (see FIG. 14) is one means to determine its instantaneous azimuth.

Figure 16:
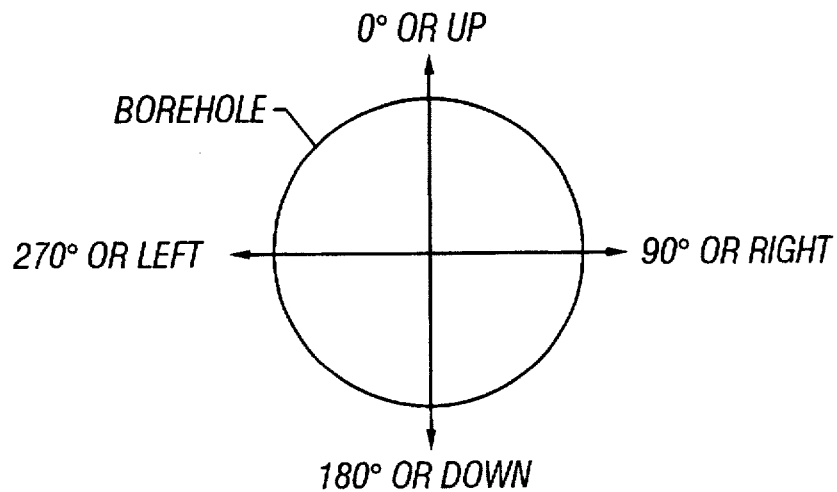
FIG. 16 is an overhead view of a borehole divided into radial quadrants.

In operation, the newly shielded transmitter coil 34T may broadcast continuously or in sequential bursts as the second sub 40 rotates. By dividing the circumference of the borehole into at least two sectors (shown in FIG. 16), each burst of EM energy can be correlated with a specific sector. In other words, when the newly shielded transmitter coil 34T is oriented toward a particular quadrant, the EM signals received at the receiver coil 34R are processed according to the respective quadrant (e.g., up, right, down, left). Although four sectors are shown in FIG. 16, the measurements may be divided into any feasible number of sectors. For continuous broadcasting, the received EM signals may be tracked according to the RPM of the motor 36.

The system 100 may be implemented in an alternate configuration with the receiver coil 34R mounted on the second sub 40 and the transmitter coil 34T mounted on the first sub 30. It will be understood that alternative system 100 configurations may include multiple transmitter coils 34T and/or multiple receiver coils 34R. An alternative configuration may also comprise the use of a transmitter 34T and/or a receiver coil 34R mounted with its axis tilted from the longitudinal axis of the respective sub. It will also be understood by those skilled in the art that additional instruments or tool subs may be configured into the system 100, e.g., a bent-housing unit. It will be further understood that any additional tool or sub that is configured into the system 100 may be designed as conventional mutually balanced induction tools or in any way in which total voltages, ratios of voltages or sums or differences are measured.

The directional measurements obtained with this system 100 should have good immunity to various systematic errors. This results from the differential nature of the measurement, which compares "up" signals to "down" signals, and "left" signals to "right" signals, etc. For example, an over-all change in background resistivity will not affect the differential "up" versus "down" data. Integrating over many revolutions will also tend to cancel many other possible sources of error, such as coil impedance drift. Additionally, by varying the distance between the first sub 30 and the second sub 40, the formation measurement will have a reasonable depth of investigation.

Figure 17:
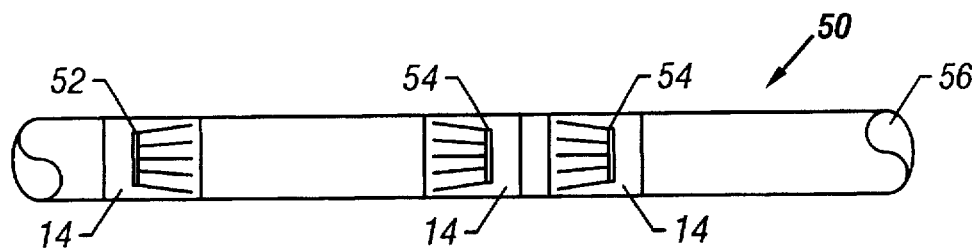
FIG. 17 is a schematic diagram of a logging tool configuration in accord with the invention.

Turning to FIG. 17, another embodiment of the invention is shown. A tool 50, similar to the ones disclosed in the '112 and '343 patents, may be implemented with new shields 14. An effective implementation is achieved with the tool 50 having at least one transmitter coil 52 and at least one pair of closely spaced receiver coils 54 mounted on the mandrel 56. Each coil is surrounded by a new shield 14 to rotate the axis of its magnetic dipole. Thus, each coil's 52, 54 field of influence to EM energy is established by the placement of a new shield 14 around the respective coil. The use of two receiver coils 54 provides for a quasi borehole compensation technique in the formation measurements. Borehole compensation is further described below.

By designating borehole quadrants and tracking the received EM signals as described above, azimuthally focused measurements may be obtained with the tool 50. This configuration may also be implemented with the transmitter coil 52 and/or the receiver coils 54 having their axes tilted from the longitudinal axis of the mandrel 56. The tool 50 may be implemented in a wireline or LWD operation, with the measured data being sent to the surface as known in the art.

Figure 18:
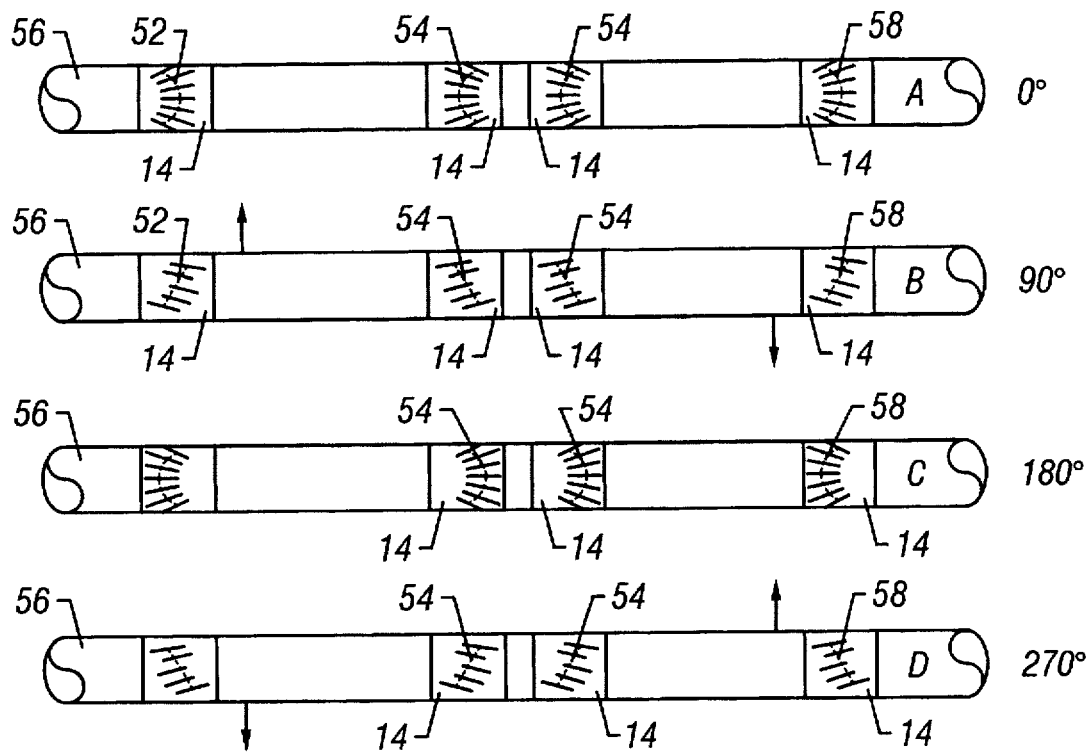
FIG. 18 is a schematic diagram of another logging tool configuration in accord with the invention.

FIG. 18 shows another embodiment of the invention. This configuration uses the tool 50 of FIG. 17, with an additional transmitter coil 58 mounted on the mandrel 56. Each coil on the tool 50 is surrounded by a new shield 14 to establish its field of influence to EM energy. FIG. 18 show four views (A–D), corresponding to 0°, 90°, 180°, and 270° azimuths of the tool 50. By mounting the additional transmitter coil 58 such that the receiver coils 54 are situated between the transmitters 52, 58, borehole compensation my be achieved in the formation measurement.

Turning to FIGS. 19A and 19B, a simplified ray diagram is shown to illustrate a conventional borehole compensation technique as described in the '112 patent. For illustration purposes, the transmitter coils 52, 58 (of the tool 50 of the invention) are respectively referred to as the uphole transmitter and the downhole transmitter with reference to FIGS. 19A and 19B. Similarly, the receiver coils 54 are referred to as R1 and R2. In FIG. 19A, the uphole transmitter is broadcasting and the downhole transmitter is off. The borehole diameter is assumed to change, in this example, from $2a$ at R1 to $2b$ at R2. The phases and amplitudes of the voltage data at R1 and R2 are respectively designated $\Phi_{1d}$, $|S_{1d}|$, and $\Phi_{2d}$, $|S_{2d}|$. As described in the '112 patent, the phase shift and the attenuation of the downwardly propagating EM wave are $$\Phi_d = \Phi_{2d} - \Phi_{1d}, \tag{4}$$

and $$A_d = 20 \log_{10}(|S_{2d}/S_{1d}|). \tag{5}$$

Turning to FIG. 19B, wherein the downhole transmitter is assumed to be broadcasting, and the uphole transmitter is assumed to be off. The phases and amplitudes of the voltage data at R1 and R2 for this case are respectively designated $\Phi_{1u}$, $|S_{1u}|$, and $\Phi_{2u}$, $|S_{2u}|$. The phase shift and the attenuation of the upwardly propagating wave are $$\Phi_u = \Phi_{1u} - \Phi_{2u}, \tag{6}$$

and $$A_u = 20 \log_{10}(|S_{1u}/S_{2u}|). \tag{7}$$

The borehole compensated phase shift ($\Phi_{BHC}$) and the borehole compensated attenuation ($A_{BHC}$) are therefore $$\Phi_{BHC} = \frac{\Phi_u + \Phi_d}{2}, \text{ and} \tag{8}$$

$$A_{BHC} = \frac{A_u + A_d}{2}. \tag{9}$$

The borehole compensated phase shift and borehole compensated attenuation greatly reduce the effects of changing borehole diameter.

Borehole compensation is performed differently for the present invention. Because phase shift and attenuation are measured at several azimuths as the tool 50 is rotated about the borehole axis, the directionality must be preserved in combining the measurements obtained from transmitter coil 52 and transmitter coil 58.

Refer to the side view (B) in FIG. 18. With transmitter coil 52 broadcasting, the direction of maximum sensitivity is up (shown by the arrow), but with transmitter coil 58 broadcasting, the direction of maximum sensitivity is down. Performing borehole compensation with both transmitters at the same azimuth would destroy the directionality of the measurement. Refer to the second side view (D) in FIG. 18, where the tool 50 has rotated 180°. Now the direction of maximum sensitivity with transmitter coil 52 broadcasting is down, and the direction of maximum sensitivity with transmitter coil 58 broadcasting is up. The essential point is that the tool 50 rotates 180° between the measurements made with transmitter coil 52 and transmitter coil 56 before applying borehole compensation. Hence, the borehole compensated quantities that preserve directionality are:

$$PS(\Psi) = [PS1(\Psi) + PS2(\Psi + 180°)]/2, \tag{10}$$

and $$AT(\Psi) = [AT1(\Psi) + AT2(\Psi + 180°)]/2, \tag{11}$$

where $\Psi$ is the tool 50 azimuth, PS1 ($\Psi$) is the phase shift measured with transmitter coil 52 broadcasting, AT1($\Psi$) is the attenuation measured with transmitter coil 52 broadcasting, PS2($\Psi$) is the phase shift measured with transmitter coil 58 broadcasting, and AT2($\Psi$) is the attenuation measured with transmitter coil 58 broadcasting. It is preferable to obtain at least four azimuths; eight or sixteen azimuths will provide better data.

It will be understood that alternative implementations of the invention may include a tool 50 comprising more transmitter coils 52, 58 and/or more receiver coil pairs 54 than shown in FIG. 18. An alternative configuration may comprise the use of transmitter coils 52, 58 and/or receiver coils 54 mounted with their axes tilted from the longitudinal axis of the mandrel 56 (not shown). Alternatively, the tool 50 may be designed as an induction tool or one where any function of voltages, sums or differences of voltages or ratios of voltages are measured. Another alternative configuration may be implemented with the tool 50 having multiple transmitter coils tilted at the same orientation with respect to the axis of the mandrel 56, but at a different orientation with respect to the receiver coil pair or pairs (not shown).

Analysis has shown that effective implementation of the shields 14 is attained by electronically coupling or connecting the shield 14 to the well tool mandrel. The shield 14 may be asymmetrically or symmetrically coupled to the mandrel, i.e., at one or both ends of the shield 14, respectively. Techniques for making such a connection include: forming the shield 14 with threaded ends to couple with the mandrel; using brackets or fasteners to mount the shield onto the mandrel; or any other suitable mounting means as known in the art.

In the case of the strip shield 20 embodiment of the invention, an electrical short may be implemented with a MosFET switch (not shown). Such an embodiment would effectively rotate the axial magnetic dipole of an antenna coil when the switch was closed. An orthogonal set of three such strip shields 20 may be placed over the coil of an induction tool, for example, to rotate the axial magnetic dipole along any unit vector direction. The vector sum of these three measurements in time would yield (after inversion) the horizontal and vertical resistivity of the surrounding earth formation.

Figure 20:
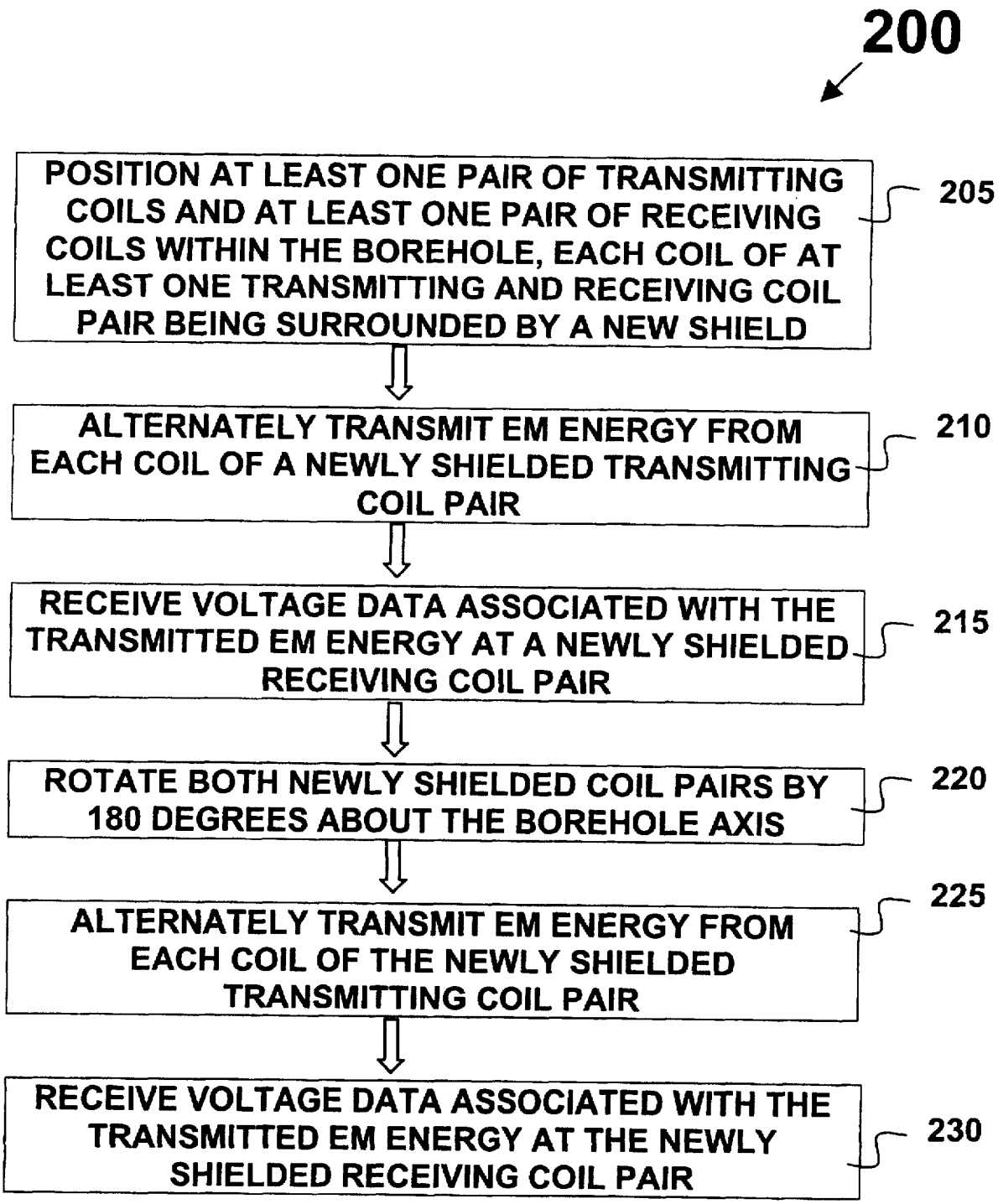
FIG. 20 illustrates a flow diagram of a method for implementation of the invention.

FIG. 20 shows a flow diagram of a method 200 for measuring the characteristics of earth formations surrounding a borehole in accord with the invention. The method comprises positioning at least one pair of transmitting coils and at least one pair of receiving coils within the borehole, each coil of at least one transmitting coil pair and each coil of at least one receiving coil pair being individually surrounded by a new shield 205; alternately transmitting electromagnetic energy from each transmitting coil of at least one newly shielded transmitting coil pair 210; receiving voltage data associated with the transmitted energy at both receiving coils of at least one newly shielded receiving coil pair 215; rotating both coils of the at least one newly shielded transmitting coil pair and both coils of the at least one newly shielded receiving coil pair by 180 degrees about the borehole axis 220; alternately transmitting electromagnetic energy from each transmitting coil of the at least one newly shielded transmitting coil pair 225; and receiving voltage data associated with the transmitted energy at both receiving coils of the at least one newly shielded receiving coil pair 230.

Figure 21:
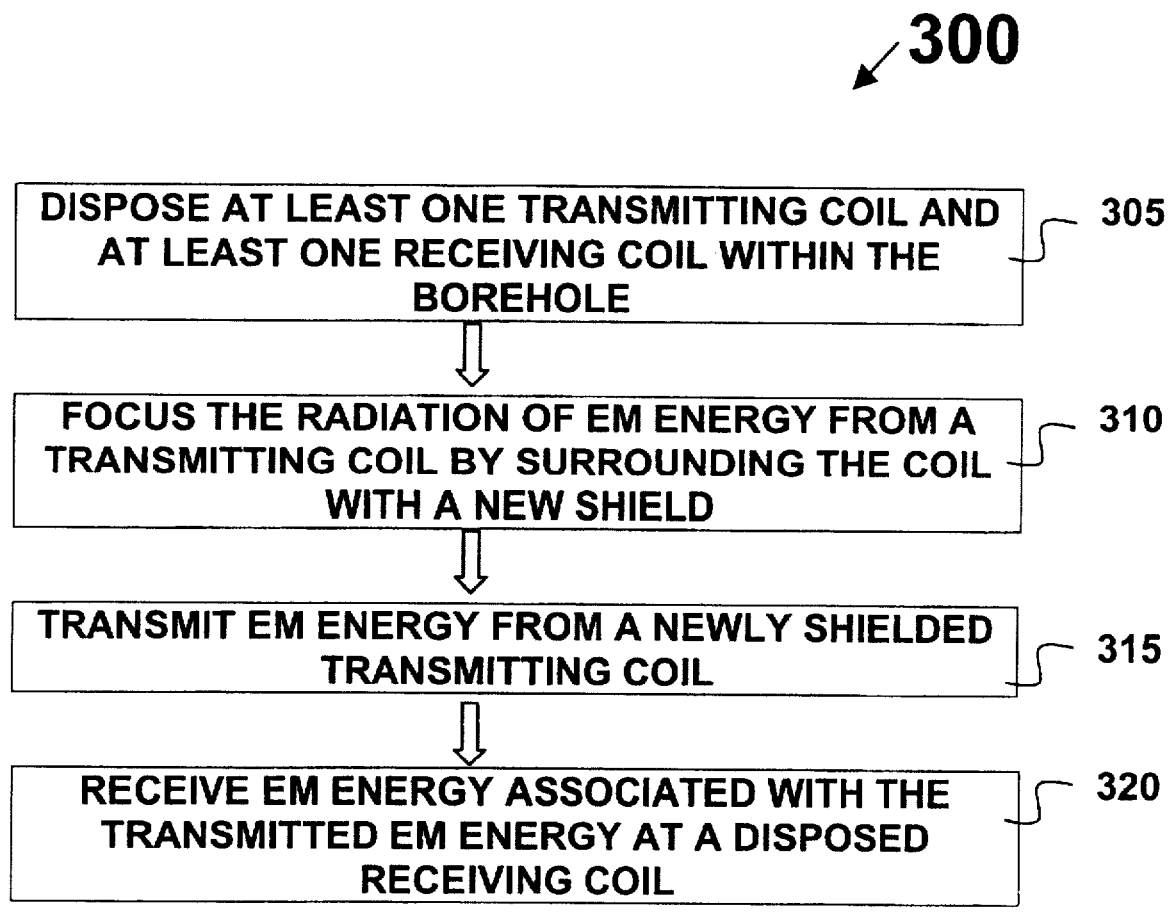
FIG. 21 illustrates another flow diagram of a method for implementation of the invention.

FIG. 21 shows a flow diagram of a method 300 for making directional measurements of an earth formation surrounding a borehole in accord with the invention. The method comprises disposing at least one transmitting coil and at least one receiving coil within the borehole, each coil being adapted to respectively transmit or receive electromagnetic energy including azimuthal, axial, or radial field components 305; focusing the radiation of electromagnetic energy from at least one transmitting coil by surrounding the coil with at least one new shield 310; transmitting electromagnetic energy from at least one newly shielded transmitting coil 315; and receiving electromagnetic energy associated with the transmitted energy at a disposed receiving coil 320.

Figure 22:
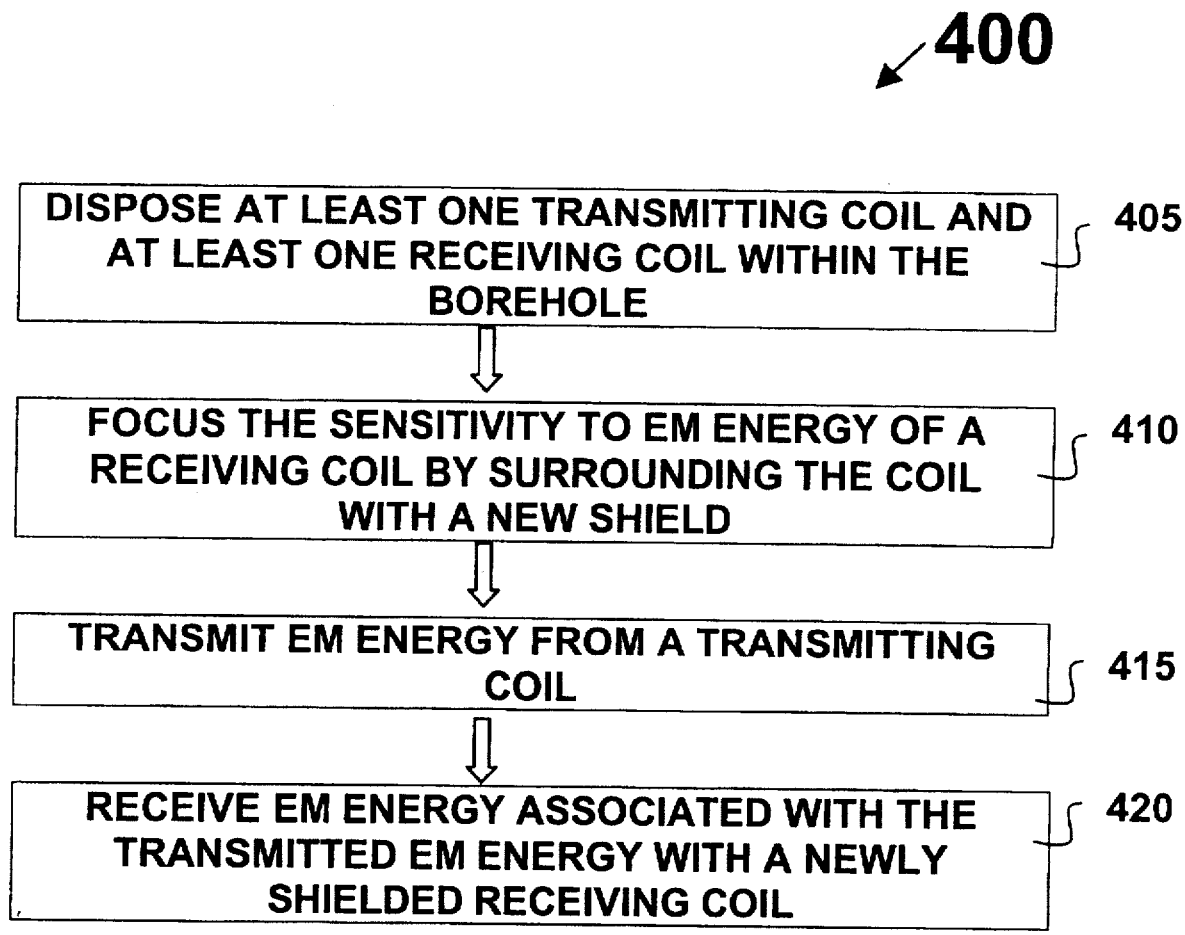
FIG. 22 illustrates another flow diagram of a method for implementation of the invention.

FIG. 22 shows a flow diagram of another method 400 for making directional measurements of an earth formation surrounding a borehole in accord with the invention. The method comprises disposing at least one transmitting coil and at least one receiving coil within the borehole, each coil being adapted to respectively transmit or receive electromagnetic energy including azimuthal, axial, or radial field components 405; focusing the sensitivity to electromagnetic energy of at least one receiving coil by surrounding the coil with at least one new shield 410; transmitting electromagnetic energy from at least one transmitting coil 415; and receiving electromagnetic energy associated with the transmitted energy with at least one newly shielded receiving coil 420.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A directional logging apparatus for measuring characteristics of earth formations surrounding a borehole, comprising:

a longitudinal support means having two ends and adapted to be moveable through the borehole;

at least one transmitting coil and at least one receiving coil mounted on the support means, each coil respectively adapted to transmit or receive electromagnetic energy having azimuthal, axial, or radial field components; and at least one transmitting coil or at least one receiving coil being surrounded by a shield, the shield having at least one sloped slot or sloped conductive element therein, each at least one sloped slot or sloped conductive element being sloped at an angle with respect to the longitudinal axis of the support means to provide selective attenuation of at least one of the electromagnetic energy field components as the component interacts with the shield;

whereby the formation characteristics are measured in a focused direction due to the placement of the shield on the at least one transmitting or receiving coil.

2. The logging apparatus of claim 1, wherein the formation characteristic is resistivity.

3. The logging apparatus of claim 1, wherein at least one transmitting coil or at least one receiving coil is surrounded by multiple overlaid shields.

4. The logging apparatus of claim 1, the longitudinal support means further comprising a sub at an end thereof, the sub having a bottom end and being adapted to rotate about the longitudinal axis of the support means.

5. The logging apparatus of claim 4, the longitudinal support means further comprising means for determining an instantaneous azimuth.

6. The logging apparatus of claim 4, further comprising a drill bit connected at the bottom end of the sub.

7. The logging apparatus of claim 6, the longitudinal support means further comprising motor means adapted to rotate the sub.

8. The logging apparatus of claim 4, wherein the at least one shielded transmitting coil or the at least one shielded receiving coil is mounted on the sub.

9. The logging apparatus of claim 8, wherein the at least one shielded transmitting coil or the at least one shielded receiving coil is mounted on the sub such that the axis of the at least one coil is tilted from the longitudinal axis of the support means.

10. A system for making downhole measurements during the drilling of a borehole using a drill string, the system comprising:

a first sub connected at the bottom end of the drill string;

a second sub having a drill bit connected at an end thereof;

a motor means connected between the first and second sub;

the first and second sub each having at least one antenna mounted thereon;

each at least one antenna adapted to transmit or receive electromagnetic energy having azimuthal, axial, or radial field components; and at least one antenna being surrounded by a shield, the shield having at least one sloped slot or sloped conductive element therein, each at least one sloped slot or sloped conductive element being sloped at an angle with respect to the axis of the borehole to provide selective attenuation of at least one of the electromagnetic energy field components as the component interacts with the shield.

11. The system of claim 10, wherein at least one antenna is surrounded by multiple overlaid shields.

12. The system of claim 10, wherein the motor means is adapted to rotate the second sub.

13. The system of claim 10, the second sub further comprising means for determining an instantaneous azimuth.

14. The system of claim 10, wherein at least one antenna is mounted on the first or second sub such that the axis of the at least one antenna is tilted from the axis of the respective sub.

15. A directional logging apparatus for measuring characteristics of earth formations surrounding a borehole, comprising:

a longitudinal support means having two ends and adapted to be moveable through the borehole;

at least one transmitting coil and at least one pair of receiving coils mounted on the support means, each coil respectively adapted to transmit or receive electromagnetic energy having azimuthal, axial, or radial field components; and at least one transmitting coil or both coils of at least one pair of receiving coils being surrounded by a shield; the shield having at least one sloped slot or sloped conductive element therein, each at least one sloped slot or sloped conductive element being sloped at an angle with respect to the longitudinal axis of the support means;

whereby each at least one sloped slot or sloped conductive element provides selective attenuation of at least one of the electromagnetic energy field components as the component interacts with the shield to measure the formation characteristic in a focused direction.

16. The logging apparatus of claim 15, wherein the apparatus is adapted for use during drilling of the borehole.

17. The logging apparatus of claim 15, wherein the formation characteristic is resistivity.

18. The logging apparatus of claim 15, wherein at least one transmitting coil or both coils of at least one receiving coil pair are surrounded by multiple overlaid shields.

19. The logging apparatus of claim 15, wherein at least one transmitting coil or both coils of at least one receiving coil pair are mounted on the support means such that their axes are tilted from the longitudinal axis of the support means.

20. The logging apparatus of claim 15, wherein at least one transmitting coil and both coils of at least one receiving coil pair are mounted on the support means such that their axes are tilted from the longitudinal axis of the support means.

21. The logging apparatus of claim 20, wherein the axes of both coils of the at least one receiving coil pair are tilted in a different direction from the axis of the at least one transmitting coil.

22. A method for measuring the characteristics of earth formations surrounding a borehole, comprising:

a) positioning at least one pair of transmitting coils and at least one pair of receiving coils within the borehole, each coil of at least one transmitting coil pair and each coil of at least one receiving coil pair being individually surrounded by a shield, each individual shield having at least one sloped slot or sloped conductive element therein, whereby each at least one sloped slot or sloped conductive element provides selective attenuation of at least one electromagnetic energy field component as the component interacts with the shield;

b) alternately transmitting electromagnetic energy from each transmitting coil of at least one shielded transmitting coil pair;

c) receiving voltage data associated with the transmitted energy at both receiving coils of at least one shielded receiving coil pair;

d) rotating both coils of the at least one shielded transmitting coil pair and both coils of the at least one shielded receiving coil pair by 180 degrees about the borehole axis;

e) alternately transmitting electromagnetic energy from each transmitting coil of the at least one shielded transmitting coil pair; and f) receiving voltage data associated with the transmitted energy at both receiving coils of the at least one shielded receiving coil pair.

23. The method of claim 22, wherein both coils of at least one transmitting coil pair or both coils of at least one receiving coil pair are tilted with respect to the borehole axis.

24. A method for making directional measurements of an earth formation surrounding a borehole, comprising:

a) disposing at least one transmitting coil and at least one receiving coil within the borehole, each coil being adapted to respectively transmit or receive electromagnetic energy including azimuthal, axial, or radial field components;

b) focusing the radiation of electromagnetic energy from at least one transmitting coil by surrounding the coil with at least one shield, each at least one shield having at least one sloped slot or sloped conductive element therein, each at least one sloped slot or sloped conductive element being sloped at an angle with respect to the borehole axis, to selectively attenuate at least one of the electromagnetic energy field components as the component interacts with the at least one shield;

c) transmitting electromagnetic energy from at least one shielded transmitting coil; and d) receiving electromagnetic energy associated with the transmitted energy at a disposed receiving coil.

25. The method of claim 24, further comprising disposing a transmitting coil or a receiving coil within the borehole such that the axis of the coil is tilted from the axis of the borehole.

26. The method of claim 24, further comprising surrounding at least one receiving coil with at least one shield, each at least one shield having at least one sloped slot or sloped conductive element therein, each at least one sloped slot or sloped conductive element being sloped at an angle with respect to the borehole axis, to selectively attenuate at least one of the electromagnetic energy field components as the component interacts with the at least one shield.

27. The method of claim 24, step (c) further comprising rotating the at least one shielded transmitting coil about the borehole axis as the at least one shielded transmitting coil is transmitting electromagnetic energy.

28. The method of claim 27, step (c) further comprising sequentially transmitting the electromagnetic energy from the at least one shielded transmitting coil as the at least one shielded transmitting coil rotates about the borehole axis.

29. The method of claim 27, step (a) further comprising dividing the circumference of the borehole into at least two sectors.

30. The method of claim 29, step (d) further comprising correlating the received electromagnetic energy with at least one of the at least two sectors.

31. A method for making directional measurements of an earth formation surrounding a borehole, comprising:

a) disposing at least one transmitting coil and at least one receiving coil within the borehole, each coil being adapted to respectively transmit or receive electromagnetic energy including azimuthal, axial, or radial field components;

b) focusing the sensitivity to electromagnetic energy of at least one receiving coil by surrounding the coil with at least one shield, each at least one shield having at least one sloped slot or sloped conductive element therein, each at least one sloped slot or sloped conductive element being sloped at an angle with respect to the borehole axis, to selectively attenuate at least one of the electromagnetic energy field components as the component interacts with the at least one shield;

c) transmitting electromagnetic energy from at least one transmitting coil; and d) receiving electromagnetic energy associated with the transmitted energy with at least one shielded receiving coil.

32. The method of claim 31, further comprising disposing a receiving coil or a transmitting coil within the borehole such that the axis of the coil is tilted from the borehole axis.

33. The method of claim 31, further comprising surrounding at least one transmitting coil with at least one shield, each at least one shield having at least one sloped slot or sloped conductive element therein, each at least one sloped slot or sloped conductive element being sloped at an angle with respect to the borehole axis, to selectively attenuate at least one of the electromagnetic energy field components as the component interacts with the at least one shield.

34. The method of claim 31, further comprising rotating the at least one shielded receiving coil about the borehole axis.

35. The method of claim 34, step (a) further comprising dividing the circumference of the borehole into at least two sectors.

36. The method of claim 35, step (d) further comprising correlating the received electromagnetic energy with at least one of the at least two sectors.

* * * * *